Oct. 1, 1957 R. C. MOORE 2,808,455

COLOR TELEVISION CAMERA SWITCHING SYSTEM

Filed June 25, 1953 3 Sheets-Sheet 1

INVENTOR.
ROBERT C. MOORE

BY Allen V. Hazeltine
ATTORNEY

Oct. 1, 1957 R. C. MOORE 2,808,455

COLOR TELEVISION CAMERA SWITCHING SYSTEM

Filed June 25, 1953 3 Sheets-Sheet 2

INVENTOR.
ROBERT C. MOORE
BY
[signature]
ATTORNEY

Oct. 1, 1957 R. C. MOORE 2,808,455

COLOR TELEVISION CAMERA SWITCHING SYSTEM

Filed June 25, 1953 3 Sheets-Sheet 3

INVENTOR.
ROBERT C. MOORE

BY

Allen V. Hazeltine

ATTORNEY

United States Patent Office 2,808,455
Patented Oct. 1, 1957

2,808,455

COLOR TELEVISION CAMERA SWITCHING SYSTEM

Robert C. Moore, Philadelphia, Pa., assignor to Philco Corporation, Philadelphia, Pa., a corporation of Pennsylvania Application June 25, 1953, Serial No. 364,067

11 Claims. (Cl. 178—5.4)

The present invention relates to color television transmission systems and more particularly to color television studio systems in which a plurality of color television image signal sources are selectively connected to a common output channel.

The studio system at a color television transmitting station generally comprises a plurality of image signal sources or "pickup units," a switching console for selectively connecting the pickup units to a common transmission or master channel, and a synchronizing signal source for establishing the horizontal and vertical scanning periods at the pickup units and for establishing a phase reference for the color image information generated. In a typical case, the studio equipment may comprise camera units for live programs, projector units for filmed programs and advertising matter, and a test pattern generating unit.

In practice, the signals derived from these pickup units are supplied to the switching console free from synchronizing information, and the latter is directly applied to the master channel. This procedure has been found to be necessary in order to prevent interruption of the synchronizing signals in the master channel, and hence to prevent loss of synchronization at the receiver during the changeover from one pickup unit to another or in the event of failure of that pickup unit which is currently connected to the master channel.

Several methods of selectively switching the pickup units to the master channel have been proposed. In one arrangement the red, green and blue, or other primary color signals, from each of the pickup units are supplied to a common switching console which, in turn, supplies the selected three primary color signals to an appropriate matrixing and modulating unit by means of which the selected signals are combined to produce a composite video wave. To the composite video wave so generated there are subsequently added the vertical and horizontal scanning synchronizing signals and a color marker signal serving as a phase reference for the color information contained in the composite video wave.

A selective switching system of the foregoing type has the disadvantage that three separate signals must be switched from each pickup unit to the master channel thereby requiring a switch having multiple contacts for each input channel. Such a switch is costly and prone to erratic operation. Furthermore, in order to monitor individually each of the pickup units, each prefade monitor must be provided with separate input terminals for each of the color signals and for the vertical and horizontal scanning synchronizing signals.

Alternatively, it has been proposed to combine the three color signals generated at each pickup unit to form individual composite color waves which, in turn, are supplied to the switching console for selective switching into the master channel. By so doing, the need for multiple switching contacts at the switching console for each input channel is obviated. However, in this case, individual cables must be provided between the monitors and the synchronizing signal source not only for the vertical and horizontal synchronizing signals but also for the color marker signal serving as the phase reference for the color information.

Because of the low frequency values of the vertical and horizontal synchronizing signals—60 c./s. and 15,750 c./s. respectively—the interconnections for these signals may be readily provided without introducing significant phase errors in the horizontal and vertical scanning circuits of the monitors. However, in the case of the color marker signal, which may have a frequency of approximately 3.58 mc./sec., it becomes necessary to control carefully the lengths of the cables between the color marker signal generator and the monitors within close tolerances in order to avoid an intolerable phase shift of the color synchronizing information supplied to the monitors. This problem has proved sufficiently severe that, in many instances, it has proved preferable not to monitor the pickup units individually prior to switching but to depend for the desired monitoring on a master monitor coupled to the master channel of the studio system.

It is an object of the invention to provide an improved color television transmission system embodying a plurality of pickup units.

A further object of the invention is to provide an improved color television studio system embodying a plurality of pickup units adapted to be selectively connected to a master channel.

Another object of the invention is to provide a color television studio system of the type in which a plurality of pickup units are selectively coupled to a master channel, to which channel image and color synchronizing signals are continuously supplied from the source of synchronizing signals.

Still another object of the invention is to provide a color television studio system of the foregoing type in which the pickup units may be individually monitored in a simple and effective manner.

Further objects of the invention will appear as the specification progresses.

In accordance with the invention, the foregoing objects are achieved by employing a transmitter system comprising a plurality of individual pickup units; means at each unit for generating a signal comprising, as one component, a composite color video wave defining the color image information and, as a second component, a marker signal serving as a phase reference for the color information; means for selectively connecting the generated signals from the pickup units to a master channel; means for continuously supplying the master channel with synchronizing signals indicative of the vertical and horizontal scanning rates of the image televised and with a marker signal indicative of the phase of the color information contained in the composite video wave; and means within the master channel for keying out of the master channel the color marker signal supplied thereto by the pickup unit connected to the master channel.

By means of this novel arrangement, the selective switching of the pickup units to the master channel may be accomplished by a simple switching system requiring only one contact for each of the pickup units. Furthermore, since the color information produced by each pickup unit is accompanied by a synchronized color marker signal, each of the pickup units may be individually monitored in a convenient and simple manner so that the quality of the color image signal may be ascertained readily prior to the switching thereof to the master channel.

The invention will be described in greater detail with reference to the appended drawings forming part of the specification and in which.

Figure 1:
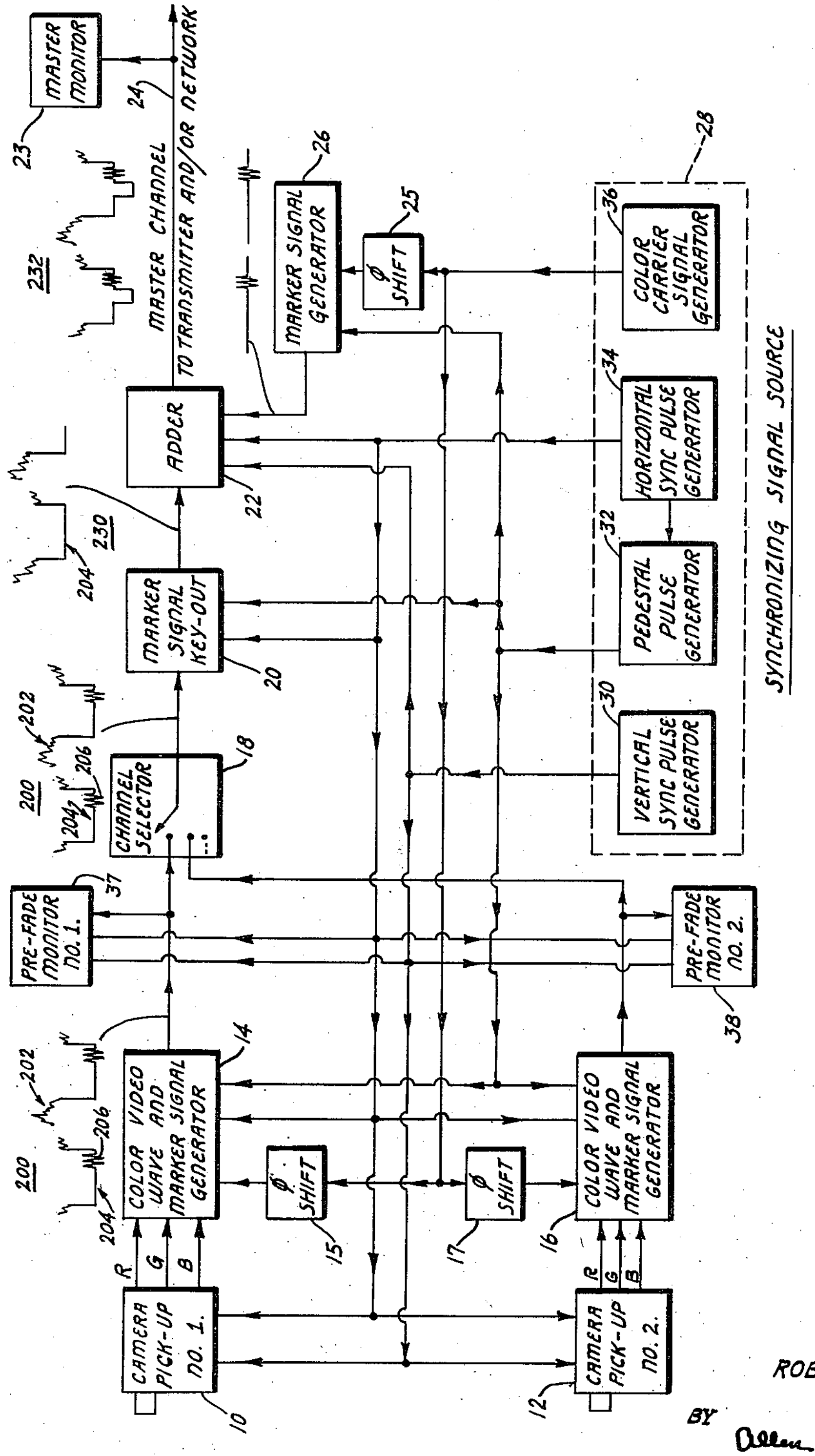
Figure 1 is a block diagram of a studio system comprising a plurality of pickup units interconnected in accordance with the invention.

Referring to Figure 1, the studio system there shown comprises pickup units 10 and 12, color video wave and marker signal generator systems 14 and 16 associated with the pickups 10 and 12 respectively, a channel selector 18, a marker signal key out system 20, and an adder 22, the output of which supplies the master channel 24 of the broadcast station. The system shown further comprises a marker signal generator 26 and a synchronizing signal source 28, the latter being made up of a vertical sync pulse generator 30, a pedestal pulse generator 32, a horizontal sync pulse generator 34, and a color carrier generator 36.

The pickup units 10 and 12 may consist of camera units, as shown, for live broadcasts, flying spot scanners for film and advertising broadcasts, test pattern generators, or various combinations thereof. While only two pickup units are shown, it will be understood that in practice more than two units will be contained in the studio system, the exact number depending on the size of the transmitting station and the types of programs to originate therein. In a typical case the studio system may comprise three camera units, two flying spot scanners, and a test pattern generator.

Each of the pickup units serves to produce three signals which in combination define the brightness and chromaticity of the successively scanned elements of the image to be televised. The signals produced may be representative of the red, green and blue primary color components of the image elements, as shown, or may be representative of three other color specifying parameters, as is well known in the art. Each of the pickup units is synchronized by appropriate horizontal and vertical scanning signals supplied thereto from the generators 30 and 34 of the synchronizing signal source 28. The construction of the pickup units, as well as the method of synchronizing the vertical and horizontal scanning circuits thereof, may conform to conventional practice and a further description of the pickup units and their mode of operation is believed to be unnecessary.

In accordance with one feature of the invention, the output signals from the several pickup units are combined to form a composite video color wave, to which is simultaneously added a marker signal serving as a phase reference for the color video wave so generated. The manner in which the color signals produced by the pickup units are combined to form a composite color video wave, and the manner in which the color reference signal is added to the composite wave, will be largely determined by the particular form of color signal to be transmitted by the broadcast station.

In accordance with present practice, the color signal transmitted by the broadcast station comprises time spaced vertical and horizontal synchronizing pulses which recur at the vertical and horizontal scanning frequencies, the color video wave which occurs in the intervals between the horizontal pulses, and a color marker signal which occurs during the so-called backporch interval of the horizontal scanning pulses.

The color video wave comprises a low frequency component, having a relatively wide bandwidth, which defines the brightness of the image elements, and a second component, in the form of a modulated subcarrier arranged at one end of the frequency spectrum of the first component, which defines, with the first component, the chromaticity of the image elements. In a typical case, the first component may have a frequency spectrum extending from 0 to 3 mc./sec., and the color subcarrier component may have a frequency of approximately 3.58 mc./sec. This color wave exists throughout each of the horizontal line scanning periods and is interrupted during the horizontal flyback periods of the pickup units to provide a blanking period during which the horizontal synchronizing pulses are transmitted, and is further interrupted during the vertical scanning flyback periods when the vertical synchronizing pulses are transmitted. The color marker signal is in the form a burst of a small number of cycles of carrier signal having a frequency equal to the frequency of the chromaticity subcarrier of the color video wave.

The generators 14 and 16, coupled to the outputs of the pickups 10 and 12 respectively and adapted to produce a signal comprising a color video wave and a marker signal as above described, may be of conventional form. A particularly satisfactory form of such a generator is described in my copending application Serial No. 296,160, filed June 28, 1952, and a block diagram of such a system modified in accordance with the requirements of my present invention is shown in Figure 2.

Figure 2:
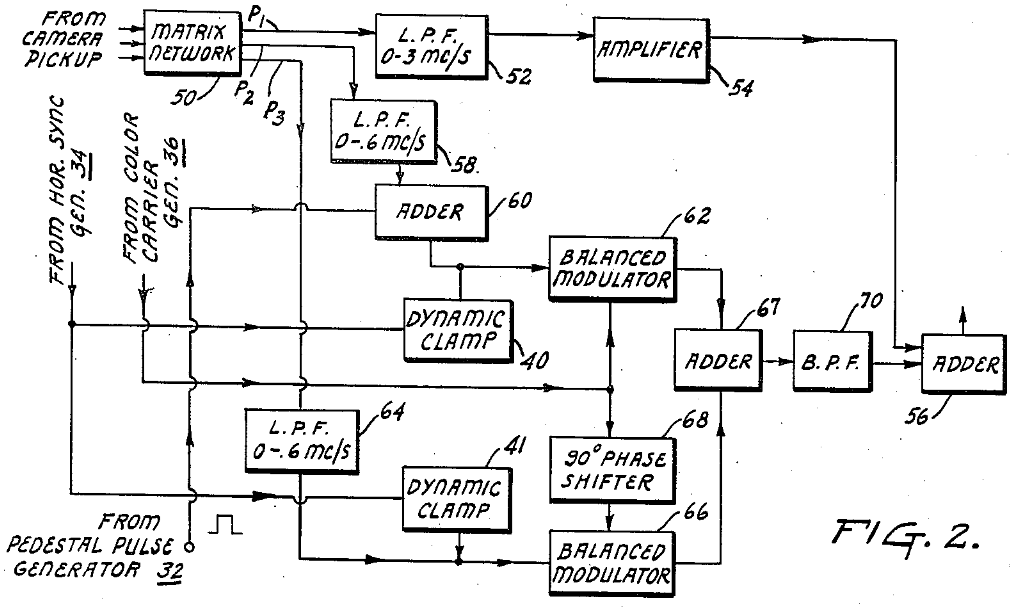
Figure 2 is a block diagram illustrating one form of a signal generating system suitable for use at the pickup positions of the studio system of Figure 1.

The generator system shown in Figure 2 comprises a matrix network 50 to which the three signals from the associated pickup unit are supplied and from which three signals $P_1$, $P_2$ and $P_3$ may be derived, which latter signals represent the desired linear transformations of the signals generated by the pickup unit. Matrix network 50 is of conventional form and may comprise suitable amplifiers, attenuators and cross-connections to produce, at the three output terminals thereof, the desired $P_1$, $P_2$ and $P_3$ signals. Such matrixing networks, for accomplishing the transformation from one color-specifying coordinate system to another, are well known in the art.

The signal $P_1$ from matrix network 50 may be passed through a low-pass filter 52 having a passband extending, for example, from 0 to 3 mc./sec. The band-limited signal is then supplied to amplifier 54 which in turn is coupled to an adder 56 in which the signal is combined with other signals determined by the signals $P_2$ and $P_3$ at the output of the matrix 50, as will be described more fully hereinafter. Adder 56 may be of conventional form and may consist, for example, of a plurality of thermionic tubes, the input grid circuits of which are separately energized by the respective input signals supplied to the adder, and the output anode circuits of which are connected to a common load impedance.

The signal $P_2$ from matrix network 50 is supplied through a low-pass filter 58 and an adder 60 to a balanced modulator 62. Filter 58 serves to eliminate unnecessary high frequency components of the $P_2$ signal, representing information to which the human eye is substantially insensitive, and, when $P_2$ is a signal representing the difference between one primary color signal and the luminosity signal—i. e. R–Y or Z–Y—the filter 58 may have a passband extending from 0 to 0.6 mc./sec. The adder 60 may be similar in construction to the adder 56 and its purpose will become apparent hereinafter.

Similarly the signal $P_3$ from the matrix network 50 is supplied through a low-pass filter 64 to a balanced modulator 66, filter 64 conveniently having a passband substantially identical with that of filter 58.

Balanced modulator 62 is additionally supplied with a subcarrier signal derived from the color carrier generator 36 of the source 28 (see Figure 1), this carrier signal being additionally supplied to the balanced modulator 66 through a 90° phase shifter 68 to produce a quadrature phase relationship between the subcarrier signals supplied to the two modulators 62 and 66.

The detailed arrangement of a preferred form of the balanced modulators 62 and 66 will be described hereinafter in connection with Figure 3 of the drawing. In the form herein considered, the modulators produce substantially zero amplitude of output signal at the subcarrier frequency when the input modulating signals supplied thereto have substantially zero values, but, when the input signal to either of the modulators departs substantially from zero, signals of subcarrier frequency appear at the output terminals thereof. For departures in a predetermined direction from zero of the input signal to balanced modulator 62, the phase of the output signal from the modulator has a predetermined reference value, while, for departures of input signals in the opposite direction from zero, the modulator output signal is of precisely opposite phase. A similar characteristic exists for balanced modulator 66, except that, due to the quadrature phase shift of the subcarrier signals supplied to modulator 66, the output signal of that modulator is in phase quadrature with that from modulator 62.

To insure balance of the modulators 62 and 66 during the television blanking intervals, so as to avoid generating subcarrier signals at such times, signal clamping devices are preferably utilized at the input terminals of the balanced modulators. These serve to control the D. C. level of the signals supplied thereto in such manner that the signal level existing during the blanking period corresponds to the bias voltage for which the modulators are balanced. Since the signals $P_2$ and $P_3$ may, in general, depart from zero in either direction, ordinary clamping circuits which level at one extreme of a signal are inappropriate for the present purpose. Instead, dynamic clamps 40 and 41 are connected to the input circuits of balanced modulators 62 and 66 respectively, these clamps being rendered operative to produce leveling only during the blanking intervals. This gating of the dynamic clamps may be accomplished by suitable gating signals supplied thereto from the horizontal synchronizing signal generator 34. Details of the nature and operation of dynamic clamps suitable for this purpose are well known in the art, and are described for example in U. S. Patent No. 2,229,945 of K. R. Wendt for a "Direct Current Reinserting Circuit."

The two amplitude-modulated subcarrier components from balanced modulators 62 and 66, which are in phase quadrature, may be combined by means of an adder 68 which may be similar to the adder 60 and which produces at the output thereof a phase- and amplitude-modulated resultant subcarrier signal. This resultant subcarrier signal may then be passed through a bandpass filter 70 to the aforementioned adder 56 for combination with the signal $P_1$ derived from amplifier 54. The passband of filter 70 may suitably extend on either side of the frequency of the subcarrier signal only by an amount necessary to accommodate those modulation components necessary to provide the desired color information, and may have a bandwidth twice that of filter 58, for example.

In order to apply a color reference signal, in the form of bursts of the subcarrier signal, to the composite color video wave produced by the addition of the signals from amplifier 54 and adder 67, there is added to the signal $P_2$ supplied to modulator 62 a pedestal pulse signal occurring during the back porch intervals preceding each active scanning line of the television image. This pedestal pulse signal may be derived from the horizontal sync pulses by means of the pedestal pulse generator 32 which is contained in the synchronizing signal source 28 and which will be more fully described hereinafter.

The pedestal pulses are supplied to the adder 60 and thereby to the input terminals of balanced modulator 62, and serve to unbalance the modulator during their occurrence. The result of this unbalancing is to produce, at the output terminals of balanced modulator 62, a burst of subcarrier signal occurring during the back porch intervals of the horizontal blanking pulses, and having a phase coherent with, and indicative of, the phase of the subcarrier component produced by balanced modulator 62 in response to a predetermined polarity of modulation by the signal $P_2$.

Since this burst of subcarrier signal occurs during the blanking interval, it is supplied to the adder 68 at a time when there is no contribution thereto from balanced modulator 66. The burst of subcarrier signal then passes through bandpass filter 70 to the adder 56 so that, at the output of adder 56, there is produced a signal as shown at 200 in Figure 1. As will be noted, the signal 200 comprises spaced components 202 which are constituted by the composite color video wave and which recur at the horizontal scanning frequency. The components 202 are separated by blanking intervals 204 equal to the horizontal retrace periods, during which latter periods the color burst reference signals 206 occur.

Figure 3:
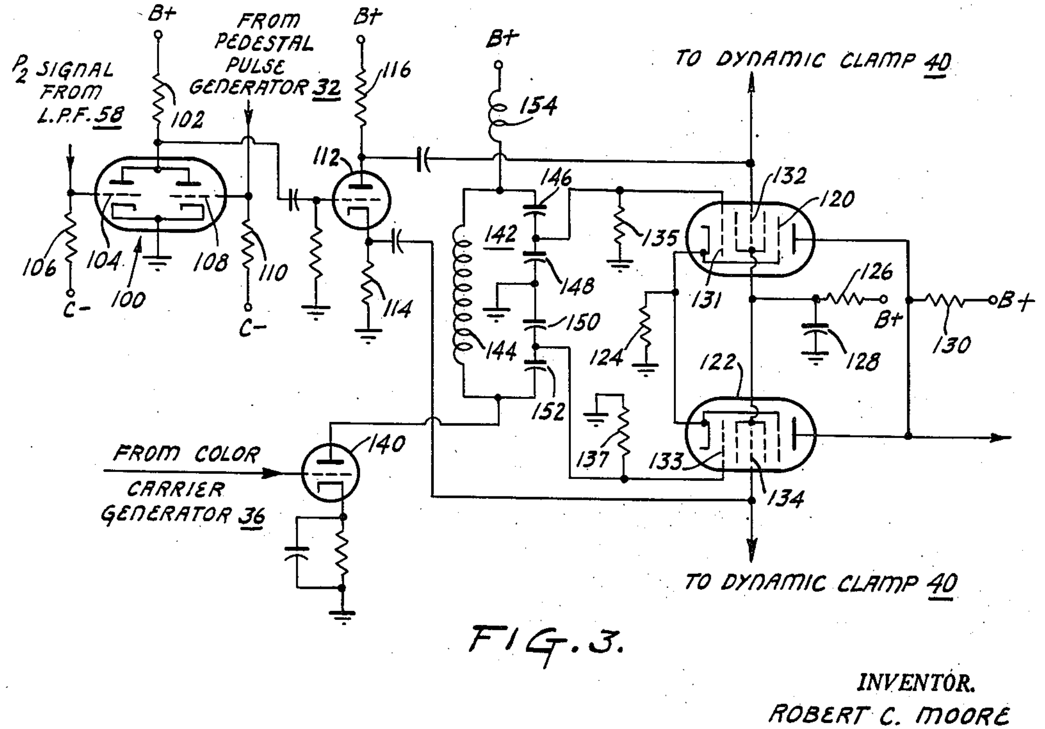
Figure 3 is a schematic diagram of a portion of the system of Figure 2.

One suitable form of the balanced modulators of Figure 2, and of the means for unbalancing one of these balanced modulators in response to the pedestal pulse, is represented in detail in Figure 3. The $P_2$ signal from low-pass filter 58 and the pedestal pulse signal from the generator 32 are supplied to an adder which comprises, in essence, a double triode circuit having a common plate load, the grid of one triode being supplied with the signal $P_2$ and the grid of the other triode being supplied with the pedestal pulse signal. For this purpose there may be employed a double-triode vacuum tube 100 comprising a pair of cathodes, which may both be grounded, and a pair of anodes which may be connected together and, through a common load resistor 102, to a suitable source of positive potential designated B+. The grid 104 of the first section of double-triode 100 may be supplied with the signal $P_2$ from low-pass filter 58, and with an appropriate bias supplied through grid resistor 106 from a source of negative potential designated C—. The grid 108 of the second section of triode 100 is then supplied with the pedestal pulse signal from generator 32, and with an appropriate bias by way of grid resistor 110 from a source designated C—.

Since the signals at the two grids of double-triode 100 are additive in their effects upon plate current, the plate voltage of the double-triode is substantially proportional to the sum of the pedestal pulse signal and the signal $P_2$. This combined signal may then be passed through an RC coupling circuit to the grid of a triode 112 connected as a phase splitter. The cathode of triode 112 may be connected to ground through a cathode-load resistor 114, while the plate of this tube is connected to B+ through a plate load resistor 116. Resistors 114 and 116 preferably have equal values, so that the voltages produced thereacross in response to the same tube current will be equal at all times, but of opposite phases. The signal between the plate and cathode of tube 112 therefore comprises a push-pull version of the combined signal $P_2$ and pedestal pulse signal. This push-pull signal is applied to corresponding grids of two multigrid vacuum tubes comprising the balanced modulator.

The balanced modulator illustrated comprises a pair of pentagrid vacuum tubes 120 and 122. The suppressor grids of these tubes may each be connected to the cathodes thereof, and the cathodes of the two tubes, in turn, connected together and through a common cathode resistor 124 to ground. The second and fourth grids of each of the tubes may be supplied with appropriate screen potentials from B+ by way of a dropping resistor 126 and a screen by-pass condenser 128. The plates of the tubes are connected together and, through a common plate load resistor 130, to B+. The effects upon plate voltage of varying the plate currents of the two tubes are therefore effectively added together at the plates of the tubes.

The third grid 132 of tube 120 is supplied with one signal from the plate of triode phase inverter 112 by way of a coupling condenser, while the third grid 134 of tube 122 is supplied with a signal of opposite polarity from the cathode of phase inverter tube 112 by way of a coupling condenser.

Tubes 120 and 122 and their associated circuits should be so adjusted that the characteristics of the two tubes are substantially identical, particularly with regard to gain, in the absence of signal varations supplied thereto. By means of the dynamic clamp 40 (see Figure 2), the D.-C. level of the modulating signals applied to grids 132 and 134 is controlled so that the voltages applied to these grids, during the blanking intervals of the modulating signal, are the same as those bias voltage for which the gains and plate currents of the two tubes 120 and 122 are balanced and equal.

The subcarrier signal from the carrier sginal generator 36 (see Figure 1) is converted to push-pull form, for application to balanced modulator tubes 120 and 122, by means of a triode tube 140 having its input grid connected to the generator 36 and its anode connected to a source of B+ by way of a tuned plate circuit 142.

The active portion of the plate circuit 142 comprises an inductive element 144 which is parallel resonant with the series combination of condensers 146, 148, 150 and 152. The end of this tuned circuit opposite from the anode of the tube 140 may be connected to the source of B+ by way of a suitable choke 154. Condensers 146 and 152 are preferably equal in value and comprise the major part of the capacitive reactance of the tuned circuit. The condensers 148 and 150, which are preferably equal in value, are grounded at their common connection, and their interconnection with the condensers 146 and 152 provides a pair of push-pull output terminal points in the tuned circuit. Due to the D.-C. blocking characteristics of the condensers, the oppositely phased, push-pull subcarrier oscillations may be supplied directly to the respective first grids 131 and 133 of the tubes 120 and 122 of the balanced modulator, these grids being also provided with appropriate grid resistors 135 and 137.

The operation of the balanced modulator arrangement of Figure 3 is as follows. In the absence of a signal $P_2$ and of a pedestal pulse signal from adder tube 100, a subcarrier signal applied to the grid of tube 140 is converted to a push-pull signal by the tuned plate circuit 142, and applied in opposite phases to the first grids 131 and 133 of tubes 120 and 122 of the balanced modulator. Since the gains of the tubes 120 and 122 are equal under these conditions, the oppositely-phased subcarrier signals so applied produce exactly equal and opposite effects upon the common plate current through plate load resistor 130, and no resultant subcarrier signal output is therefore produced at such times. Under these conditions, the modulator is said to be balanced.

During the periods of the blanking intervals of signals applied to grids 132 and 134 of the modulator tubes, the modulator remains balanced due to the aforesaid action of the dynamic clamp 40 which maintains the reference bias on these grids during the blanking intervals at the proper value to maintain balance. However, during the image-representing portions of the signal $P_2$, the latter signal may depart from the blanking level, producing a corresponding change in the potential applied to grid 132 of tube 120 and an opposite change in the potential of grid 132 of tube 122. The effect of this change is to produce a difference in the gains of modulator tubes, and hence a difference in the amplitudes of the oppositely-phased subcarrier components produced across common plate-load resistor 130. As a result, there will be a net subcarrier signal output at such times having an amplitude substantially proportional to the deviations from the blanking level of the image-representing signal $P_2$.

During those portions of the blanking intervals when pedestal pulse signals are supplied through the adder tube 100 to phase inverter 112, a similar unbalance of the modulator tubes occurs producing a burst of subcarrier oscillations across plate load resistor 130.

The details of balanced modulator 66 (Figure 2) may be substantially identical with those described with reference to Figure 3, and it will therefore be obvious that the output signal of balanced modulator 66 will be zero during the generation of the subcarrier burst signal by balanced modulator 62 in view of the fact that the pedestal signal is not supplied to the modulator 66.

Similar modulating and burst signal generating systems may be associated with each of the pickup units of the studio system, so that there is produced in each of the pickup channels a signal of the form illustrated at 200 in Figure 1.

Since these signals contain an accurately phased color marker signal, it is only necessary to supply the prefade monitors 37 and 38 with appropriate vertical and horizontal synchronizing signals from the source 28 in order to reproduce accurately the color image signals contained in the channel. This may be done without difficulty, by means of simple connections because, as previously pointed out, no significant phasing problems are introduced in view of the relatively low frequencies of the vertical and horizontal sync pulses. Furthermore, since the color image information component of the signal is in the form of a composite signal, a channel selector of relatively simple construction, consisting substantially solely of a movable switch arm and a single contact for each channel, may be used for selectively connecting the pickup units to the master channel.

As previously pointed out, in accordance with present practice the color marker reference signal, together with vertical and horizontal synchronizing signals, are continuously supplied to the master channel in order to prevent loss of synchronism at the receiver during the switching of the pickup units or in the event of failure of the active pickup at the transmitter.

In accordance with the second feature of the invention, interaction between the color marker signal which appears at the output of the channel selector 18 and the color marker signal which is continuously supplied to the master channel is avoided by keying out the color marker signal component of the signal appearing at the output of the channel selector. This may be achieved by means of the burst signal key out system 20, one suitable form of which is shown in Figure 4.

Figure 4:
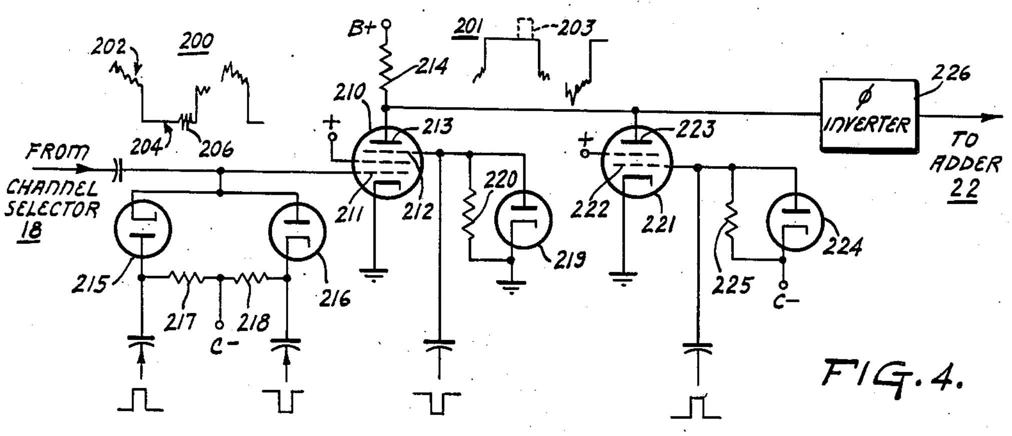
Figure 4 is a schematic diagram of one form of keyer suitable for the studio system of Figure 1.

The burst key out system shown in Figure 4 comprises a multigrid discharge tube 210 having a first control grid 211 to which the signal 200 is applied from the output of the channel selector 18, a second control grid 212 to which negative going pedestal pulses derived from the generator 32 are applied, and an anode 213 which is supplied from a voltage source B+ through a load resistor 214. The control grid 211 is maintained at the desired operating bias value by means of a dynamic clamp which may be similar to the clamps 40 and 41 referred to in connection with Figure 2 and which, in the form shown in Figure 4, comprises two diode elements 215 and 216. The cathode of diode 215 and the anode of diode 216 are connected in common to the control grid 211. Furthermore the anode of diode 215 is supplied with positive going pulses derived from the horizontal sync generator 34 and with a negative bias from a source C— supplied through a resistor 217, whereas the cathode of diode 216 is supplied with negative going pulses derived from the horizontal sync generator and with a negative bias from the source C— supplied through a resistor 218. These pulses of opposite polarity may be produced by means of a phase inverter (not shown) similar to the phase inverter 112 shown in Figure 3.

The control grid 212 of the tube 210 is maintained at the desired operating bias value by means of a D.-C. restorer of conventional form and consisting of a diode 219 shunted by a resistor 220.

Shunting the output circuit of the tube 210 is a tube 221 having a control grid 222 to which positive going pedestal pulses derived from the generator 32 are supplied, and an anode 223 which is directly connected to the anode 213 of tube 210. The control grid 222 is supplied with the desired operating bias value from the source C— through a D.-C. restorer of conventional form and consisting of a diode element 224 and a resistor 225. The pedestal pulses of opposite polarities, supplied to the control grid 212 of tube 210 and the control grid 222 of tube 221, may be produced by means of a phase inverter (not shown) similar to the phase inverter previously described.

In operation, the tube 210 is normally conducting so that the component 202 of the input signal 200 and the portions of the blanking period 204 preceding and following the carrier burst 206 are reproduced in opposite phase polarity across the load resistor 214. However, during the occurrence of the burst signal 206 tube 210 is suddenly cut off by the negative going pedestal pulse supplied to the grid 212. At this time the anode current of tube 210 is reduced to zero and normally this action would superimpose a pedestal on the blanking portion of the output signal as shown at 203 in dotted lines. The production of this pedestal is avoided by the tube 221 which, by reason of the positive going pedestal pulse supplied to the grid 222 thereof, concurrently produces a counteracting current flow through the load resistor 214. The amount of correction thus supplied by the tube 221 may be adjusted to exactly compensate the effect produced by cut-off of the tube 210 by appropriately adjusting the bias value of the control grid 222 of tube 221.

The output signal 201, produced as aforesaid, may be reversed in polarity to produce the signal 230 of Figure 1 by means of a phase inverter 226 of conventional form. The modified signal 230 is in turn supplied to the adder 22 which is also supplied with vertical and horizontal scanning synchronizing pulses and a color marker signal and thereby produces the desired master channel signal which is shown at 232.

Adder 22 may be of conventional form and may typically consist of four discharge tubes having individual input circuits and having their anodes connected in common to a suitable load impedance and may therefore be similar in construction to the adders previously described. The signal 230 is applied to one of the input grids, and similarly the vertical and horizontal sync pulses are applied to two others of the input grids by means of suitable connections to the sync pulse generators 30 and 34. The color burst reference signal may be applied to the remaining input grid, this latter signal being supplied by the marker signal generator 26, one suitable form of which is shown in Figure 5.

Figure 5:
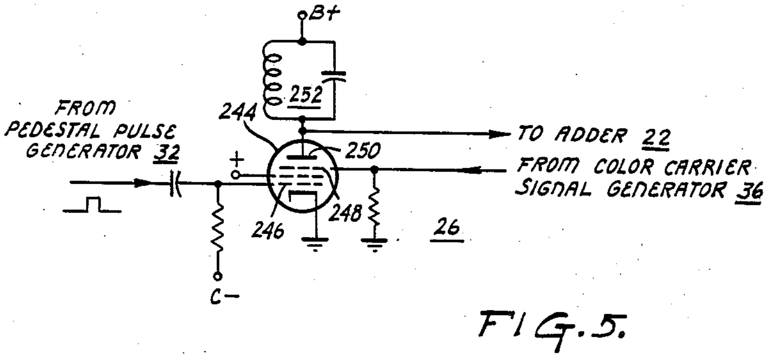
Figure 5 is a schematic diagram showing one form of a color reference signal generator suitable for the studio system of Figure 1.

The marker signal generator shown in Figure 5 comprises a multigrid discharge tube 244 having a first control grid 246, a second control grid 248 and an anode 250, the latter being supplied from a positive voltage source shown as B+ through a load impedance 252 consisting of an inductance-capacitance network resonant at the frequency of color sub-carrier. The tube is maintained normally non-conductive by means of a cut-off bias applied to the grid 246 through a conventional grid resistor coupled to a negative voltage source shown as C—, and is adapted to be made conductive at selected intervals by means of a positive going pulse supplied to this grid from the pedestal pulse generator 32. Under these conditions, when a carrier signal from the generator 36 is supplied to the control grid 248 of the tube 244, there will be produced at the anode 250 bursts of the carrier signal which, as shown at 27 in Figure 1, recur at time intervals as determined by the pedestal pulse signal supplied to the control grid 246.

The absolute phase position of the burst carrier signal 27, produced by the color marker signal 26 and appearing at the output circuit of the adder 22, will be determined by the total effective length of the electrical path between the color carrier signal generator 36 and the output circuit of the adder 22. Similarly the nominal phase position of the phase- and amplitude-modulated subcarrier component of the color video wave, supplied to the adder 22 by the marker signal key out system 20, will be determined by the total effective length of the electrical paths existing between the generator 36 and the color video wave generator associated with each pickup unit, and between the color video wave generator and the output circuit of the adder 32. It will be understood that, in order to maintain the phase of the color burst signal 27 at the output of adder 22 at a fixed predetermined value relative to the nominal phase of the subcarrier component of the color video wave, the respective electrical paths above noted must be adjusted to appropriate values. This may be most readily accomplished by adjusting the physical length of the supply lines interconnecting the color carrier signal generator 36 and the color video wave and marker signal generator associated with each pickup unit, or by embodying in each of these supply lines a phase shifter as shown at 15 and 17. Alternatively there may be included, in the supply line between the generator 36 and the generator 26, a variable phase shifter 25 adapted to control the phase of the burst signal 27 to match the nominal phase of color sub-carrier of color video wave concurrently supplied to the master channel. This phase sifter may be manually controlled to the correct value as determined by an inspection of the image produced by the master monitor 23 coupled to the master channel, or may be automatically controlled by the burst signal 206 accompanying the selected color video wave and appearing in the composite signal supplied to the marker signal key out system 20.

The synchronizing signal source 28, as shown, consists of three generators 30, 34 and 36 and a pedestal pulse generator 32 coupled to the horizontal sync pulse generator 34. The generators 30, 34 and 36 may be of conventional form well known to those skilled in the art and it is believed that a description thereof is unnecessary. It is pointed out, however, that while the generators 30, 34 and 36 have been shown to be in the form of individual units, in practice these generators are interconnected to maintain a fixed synchronous relationship between the signals produced thereby. In this connection it will be understood that the sources may be synchronized from a common source of standard frequency, and that the vertical and horizontal sync pulse generators may be further interconnected to provide the standard composite synchronizing signal waveform.

Figure 6:
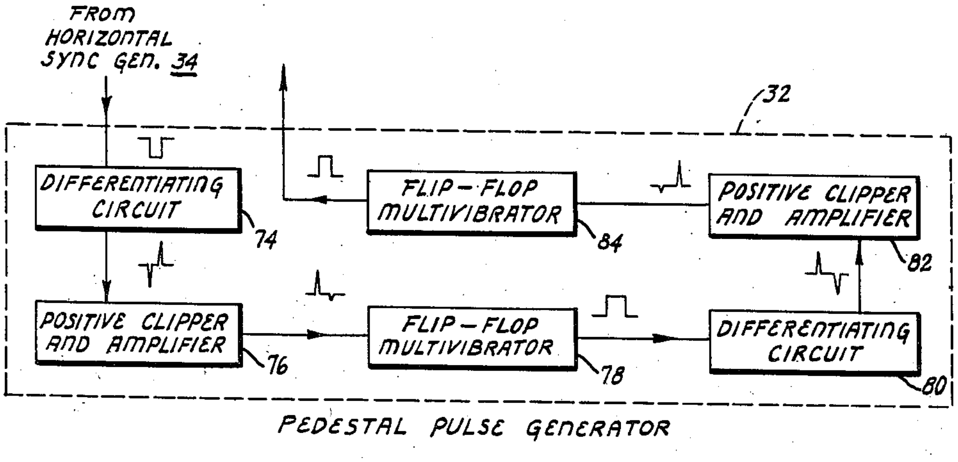
Figure 6 is a block diagram of a portion of the studio system of Figure 1.

The pedestal pulse generator 32 is preferably of the form described in my copending application referred to above. As shown in Figure 6, the generator comprises a differentiating circuit 74, a positive clipper and amplifier 76, a flip-flop multivibrator 78, a second differentiating circuit 80, a second positive clipper and amplifier 82, and a second flip-flop multivibrator 84.

The horizontal synchronizing pulses are supplied to the differentiating circuit 74, which may comprise a conventional RC circuit of relatively fast time constant, and which operates to produce one relatively narrow pulse, or pip, upon the initiation of each synchronizing pulse, and a companion pip of similar form but opposite polarity upon the occurrence of the trailing edge of the synchronizing pulse. Preferably the synchronizing pulses are negatively directed, so that the narrow pulses corresponding to the leading and trailing edges of the synchronizing pulses are negatively and positively directed respectively as shown. The differentiated synchronizing pulses may then be supplied to the positive clipper and amplifier 76, which comprises means for simultaneously amplifying the differentiated synchronizing pulses, for inverting the polarity thereof, and for substantially eliminating the effects of the applied positive pulses produced in response to the trailing edges of the synchronizing pulses. The positive clipping action may be provided at least in part by means of an appropriately biased diode clipper circuit of conventional form, or may be provided through the inherent action of the amplifier by biasing it in such manner that severe saturation occurs for positive-going input signals.

The output signal of clipper and amplifier 76 then comprises a series of relatively narrow pulses, positively directed and corresponding in time position to the occurrence of the leading edges of synchronizing pulses. These latter pulses may be used as trigger pulses to actuate the flip-flop multivibrator 78. Multivibrator 78 may be a conventional cathode-coupled multivibrator of the monostable type, which is characterized by a quiescent condition in which it remains in the absence of trigger pulses supplied thereto, which responds to a positive trigger pulse to produce a positively-directed change in the output voltage thereof, and which remains in the latter condition for a predetermined interval characteristic of the adjustment of the circuit parameters of the multivibrator, after which it automatically returns to its original quiescent condition. The result of this operation is to produce, at the output terminals of flip-flop multivibrator 78, a substantially rectangular positive pulse having a leading edge corresponding in time to the occurrence of the trigger pulses, and a trailing edge occurring at a time determined by the adjustment of the multivibrator. Preferably the multivibrator is adjusted in such manner that the trailing edge of the positive pulse produced thereby occurs slightly later than the trailing edge of the horizontal synchronizing pulse, and therefore during the back porch interval of the blanking period between consecutive horizontal line scanning periods. A suitable form for the multivibrator 78 is described on page 182 of the publication "Waveforms," volume 19 of the Radiation Laboratory Series published by McGraw-Hill Book Company, New York, 1949.

The rectangular pulses from multivibrator 78 may then be supplied to the differentiating circuit 80, which may be similar in form to differentiating circuit 74, and which operates to produce a postively-directed pip upon the initiation of each multivibrator pulse and a negatively-directed pip upon the termination thereof. The so differentiated signal may then be supplied to positive clipper and amplifier 82, which may be similar in form to positive clipper and amplifier 76, and which operates to produce a positive amplified pulse occurring at a time substantially coincident with the occurrence of the trailing edge of the pulses from multivibrator 78.

The pulses from clipper and amplifier 82 are then utilized to trigger another conventional flip-flop multivibrator 84, which may be similar to multivibrator 78, and which responds to the positively-directed trigger pulses applied thereto to produce, at its output terminals, substantially rectangular pulses of positive polarity having leading edges occurring slightly after the occurrence of trailing edges of the horizontal synchronizing pulses, and having trailing edges occurring at times determined by the particular adjustment of the circuit parameters of the multivibrator 84. Preferably these parameters are so adjusted that the trailing edges of the pulses from multivibrator 84 occur prior to the termination of the horizontal blanking intervals. The rectangular pulses produced in the output circuit of multivibrator 84 are therefore restricted to occur only during the back porch intervals of the horizontal blanking periods, and may, for example, be of substantially 2.3 microseconds duration.

From the foregoing description, it will be seen that the invention provides a novel studio system by means of which individual pickup units may be selectively connected to a master channel in a simple and inexpensive manner. Furthermore the system provides, in each of the pickup channels, a color signal which is adapted to portray accurately the image supplied to the pickup by means of individual monitors without necessitating the use of complex phasing systems for supplying a color reference signal to the monitor. In addition, the color reference signal supplied to the master channel from the prefade channels is removed in a simple manner, thereby permitting the injection of a color reference signal into the master channel at a point at which this reference signal cannot be interrupted in switching from one pickup channel to another.

While I have described my invention in a specific embodiment and by means of specific examples, I do not wish to be limited thereto for obvious modifications will occur to those skilled in the art without departing from the spirit and scope of the invention.

What I claim is:

1. A color television transmission system comprising a plurality of color image pickup units, each adapted to produce a color image signal comprising a plurality of color image defining signal components, a plurality of signal channels each coupled to a different pickup unit, means for producing in each of said signal channels a marker signal indicative of the time of occurrence of the color information defined by the said signal components of the color image signal contained in the respective channel, an additional signal channel, switching means coupled to said first-named channels and to said additional channel for selectively connecting said first-named channels to said additional channel, said additional channel comprising means for selectively attenuating the marker signal supplied thereto through said switching means, a master channel, means for coupling said additional channel to said master channel thereby to supply the selected color image signal to said master channel, and means for supplying to said master channel a marker signal indicative of the time of occurrence of the color information defined by the said signal components of the said selected color image signal supplied to said master channel.

2. A color television transmission system as claimed in claim 1 wherein each of said first-named signal channels comprises means for producing a composite signal having a first component definitive of the color image information produced by the respective pickup unit, and having a second component definitive of the time of occurrence of the color image information contained in said first component.

3. A color television transmission system as claimed in claim 1, wherein each of said first-named channels comprises means for producing a composite signal having a first component comprising a first wave having amplitude variations determined by brightness variations of the image defined by said color image signal and a modulated subcarrier wave having a given frequency and having variations defining with the variations of said first wave the chromaticity of the said image, and having a second component comprising a third wave having a frequency equal to the frequency of said subcarrier wave.

4. A color television transmission system as claimed in claim 2 wherein the said first component of said composite signal is in the form of time-spaced signal pulses recurring at a given frequency, wherein said second component of said composite signal is in the form of second signal pulses recurring in the intervals between the signal pulses constituting said first component, and wherein said additional channel comprises keying means for selectively attenuating said second signal pulses and means for actuating said keying means in synchronism with the occurrence of said second signal pulses.

5. A color television transmission system as claimed in claim 2 wherein said means for producing a composite signal comprises a balanced modulator system, means for applying an actuating carrier wave of given frequency to said balanced modulator system, and means for periodically unbalancing said modulator at a second given frequency thereby to produce said second component of said composite signal.

6. A color television transmission system comprising a plurality of color image pickup units, each of said units comprising means for producing a color image signal comprising a plurality of individual color defining signal components recurring simultaneously at spaced time intervals of given duration, a plurality of signal channels, means for coupling each of said pickup units to a different transmission channel thereby to supply the said signal components from each of said units to a different channel, each of said channels comprising means for combining the applied signal components to form during said spaced time intervals a wave consecutively indicative of the value of said signal components, said signal channels each further comprising means for producing at intervals between said spaced time intervals a marker signal indicative of the phase of said wave, an additional signal channel, switching means coupled to said first-named channels and to said additional channel for selectively connecting said first-named channels to said additional channel, said additional channel comprising means for selectively attenuating the marker signal supplied thereto through said switching means, a master channel, means for coupling said additional channel to said master channel thereby to supply said selected wave to said master channel, and means for supplying to said master channel a marker signal indicative of the phase of the said selected wave supplied to said master channel.

7. A color television transmission system as claimed in claim 6 wherein said pickup units comprise means to generate three individual color defining signals, wherein said first-named channel means comprises means for combining said signals to produce during said spaced time intervals a composite color video wave comprising a first component having an extended bandwidth and a second component in the form of an amplitude and phase modulated subcarrier signal, said first-named channel means further comprising means for generating at intervals between said spaced time intervals a marker signal in the form of a carrier wave having a fixed phase and having a frequency equal to the frequency of said subcarrier signal.

8. A color television transmission system comprising a plurality of color image pickup units, each of said pickup units in response to vertical and horizontal scanning synchronizing signals supplied thereto being adapted to produce a color image signal comprising three individual color defining signal components recurring simultaneously at spaced given time intervals of predetermined duration and at the frequency of said horizontal scanning synchronizing signal, a plurality of signal channels each coupled to a different pickup unit and energized by the three signal components produced by that unit, each of said signal channels comprising means for combining the said three signal components thereby to produce during said time intervals a composite video wave comprising a first signal component having a frequency spectrum extending to a given maximum frequency value and a second signal component in the form of a modulated subcarrier signal having a frequency approximating said given maximum frequency value, each of said signal channels further comprising means for producing at intervals between said given time intervals a marker signal in the form of a burst of a plurality of cycles of a wave having a fixed phase and having a frequency equal to the frequency of said subcarrier signal, an additional signal channel, switching means interconnecting said first-named channels and said additional channel for selectively coupling said first-named channels to said additional channel thereby to supply a selected color video wave and marker signal to said additional channel, said additional channel comprising means responsive to said horizontal synchronizing signal for selectively attenuating the said marker signal supplied thereto by said switching means, a master channel, means for coupling said additional channel to said master channel thereby to supply said selected color video wave to said master channel, and means for supplying to said master channel said vertical and horizontal scanning synchronizing signals and for further supplying to said master channel a marker signal in the form of a burst of a plurality of cycles of a wave having a frequency equal to the frequency of said subcarrier signal.

9. A color television transmission system as claimed in claim 8 wherein said means for producing a color video wave comprises a balanced modulator system, means for supplying first and second subcarrier waves to said balanced modulator system, said subcarrier waves having the same frequency and being substantially in phase quadrature, means for supplying a fire color defining signal component of said color image signal to said modulator system thereby to produce a first amplitude modulated carrier wave, means for supplying a second color defining signal component of said color image signal to said modulator system thereby to produce a second amplitude modulated carrier wave in phase quadrature with said first amplitude modulated carrier wave, and means for combining said amplitude modulated carrier waves and a third color defining signal component of said color image signal thereby to produce said color video wave, and wherein said means for producing a marker signal comprises means coupled to said modulator system for amplitude modulating one of said subcarrier waves during intervals between said given time intervals.

10. A color television transmission system as claimed in claim 8 further comprising a prefade monitor, means for connecting said monitor to one of said first channels thereby to supply said color video wave and said marker signal to said monitor, and means for supplying vertical and horizontal scanning synchronizing signals to said monitor.

11. A color television transmission system as claimed in claim 8 wherein said means for selectively attenuating said marker signal in said additional channel comprises a keying system comprising a normally conductive electrical transmission path and means responsive to said horizontal scanning synchronizing signal for rendering said path non-conductive during the time of occurrence of said marker signal.

References Cited in the file of this patent

UNITED STATES PATENTS 2,727,942 Jury ------------------ Dec. 20, 1955